United States Patent [19]
Alejandro et al.

[11] Patent Number: 5,206,537
[45] Date of Patent: Apr. 27, 1993

[54] EPCON ENERGY FIELD SYSTEM AN ENERGY PRODUCING CONGLOMERATE (EPCAN) SYSTEM USING WIND ENERGY, SOLAR PANELS, AND STEAM TURBINES

[75] Inventors: Jose L. A. Alejandro; Serge J. Grant, both of Galveston, Tex.

[73] Assignee: ECM International Inc., Tacoma, Wash.

[21] Appl. No.: 587,051

[22] Filed: Sep. 24, 1990

[51] Int. Cl.$^5$ .............................................. F03D 11/00
[52] U.S. Cl. ..................................... 290/1 R; 290/44; 290/55
[58] Field of Search ....................... 290/56, 52, 44, 55; 126/437, 438

[56] References Cited

U.S. PATENT DOCUMENTS

| | | | |
|---|---|---|---|
| 3,892,433 | 7/1975 | Blake | 290/52 |
| 4,079,591 | 3/1978 | Derby et al. | 126/438 |
| 4,080,221 | 3/1978 | Manelas | 126/438 |
| 4,159,427 | 6/1979 | Wiedemann | 126/438 |
| 4,213,303 | 7/1980 | Lane | 126/437 |
| 4,551,631 | 11/1985 | Trigilio | 290/55 |

*Primary Examiner*—A. D. Pellinen
*Assistant Examiner*—Robert Lloyd Hoover

[57] ABSTRACT

The specification discloses an Energy Producing Conglomerate (EPCON) system using wind energy, solar panels, and steam turbines producing electricity from the kinetic energy of the wind and the thermal energy of the sun. A novel single shaft configuration that supports multiple induction generators which are driven by rotors of four windtraps and/or by steam turbines which receive steam pressure from solar panels. The steam is generated by solar lens panels. Solar parabolic collector dish or a natural gas steam boiler are also contemplated in the EPCON system.

The energy producing field consists of up to a thousand of these windtrap units supported by a common water resource. A system controller supports the system by monitoring wind speeds, sun intensity, and load requirements and activates or deactivates system elements. An interconnect to a utility line and/or energy storage facility is part of the system. The units are mostly prefabricated with final installation on site without the need of any heavy equipment making it possible for buyers to install the EPCON system on their own. The windtrap unit along with the solar panels are shipped to the site via a specialized transporter that assists in the installation process. The system is further uniquely designed to be lowered to a relatively safe harbor in the event of excessive wind conditions. System maintenance is also simplified with this feature.

4 Claims, 16 Drawing Sheets

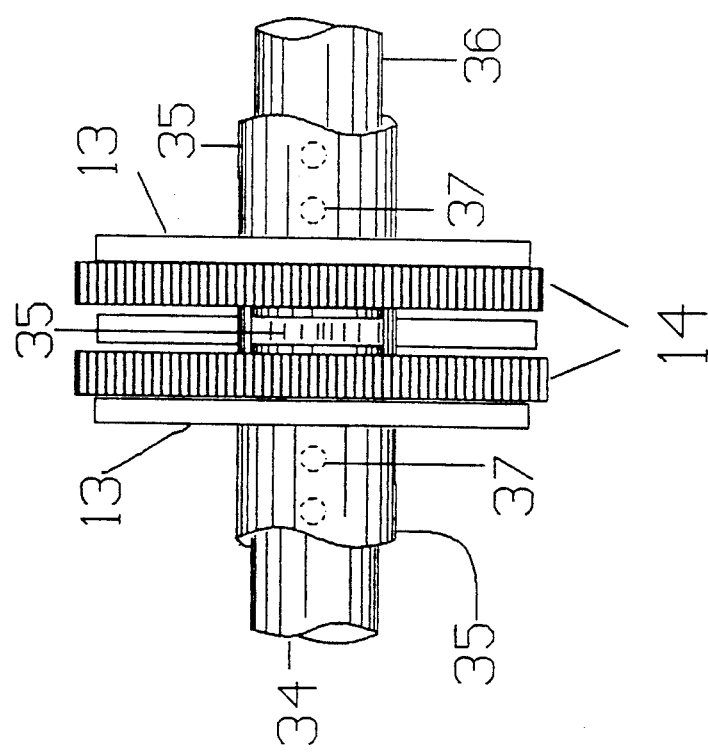
FIG. 2A
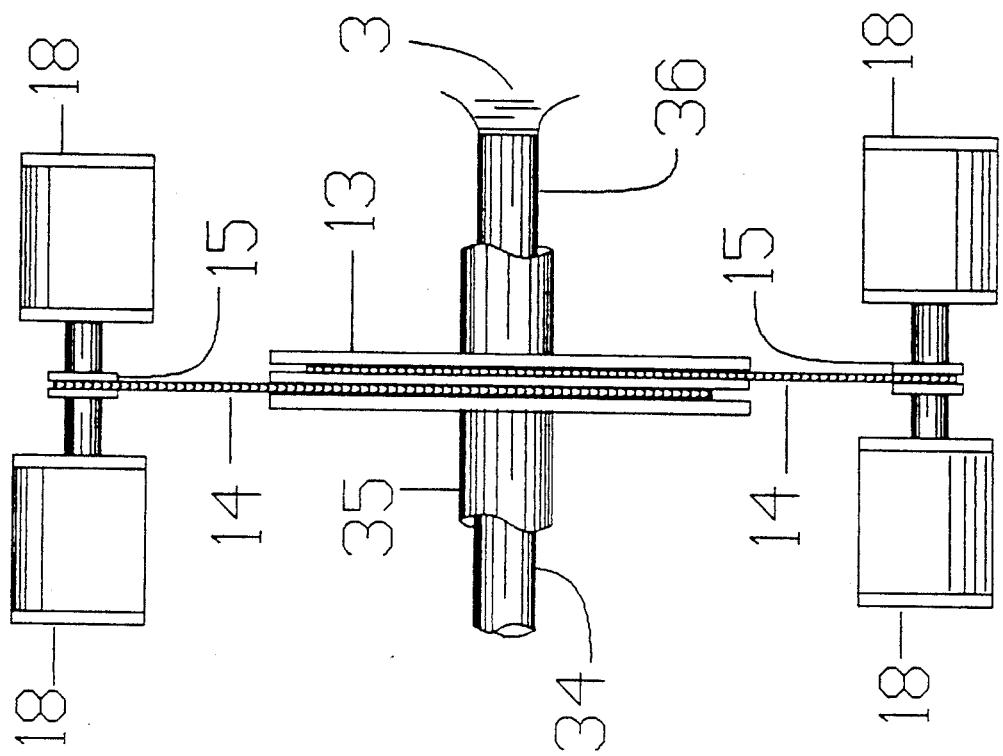
FIG. 2 "Prior Art"

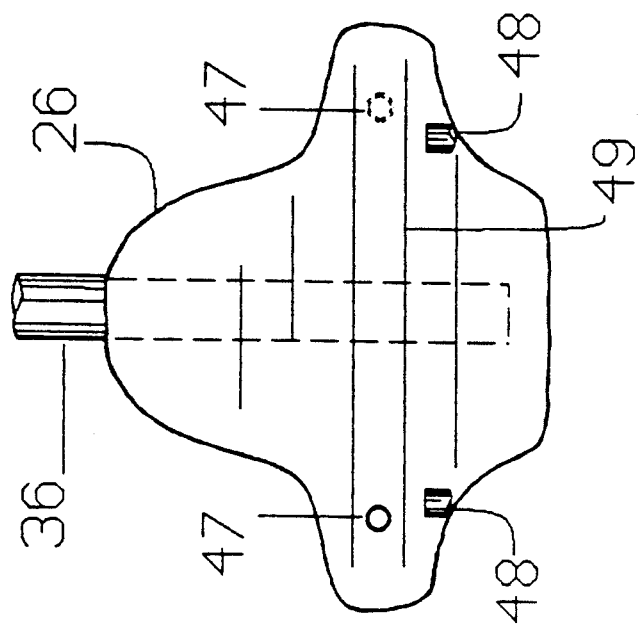
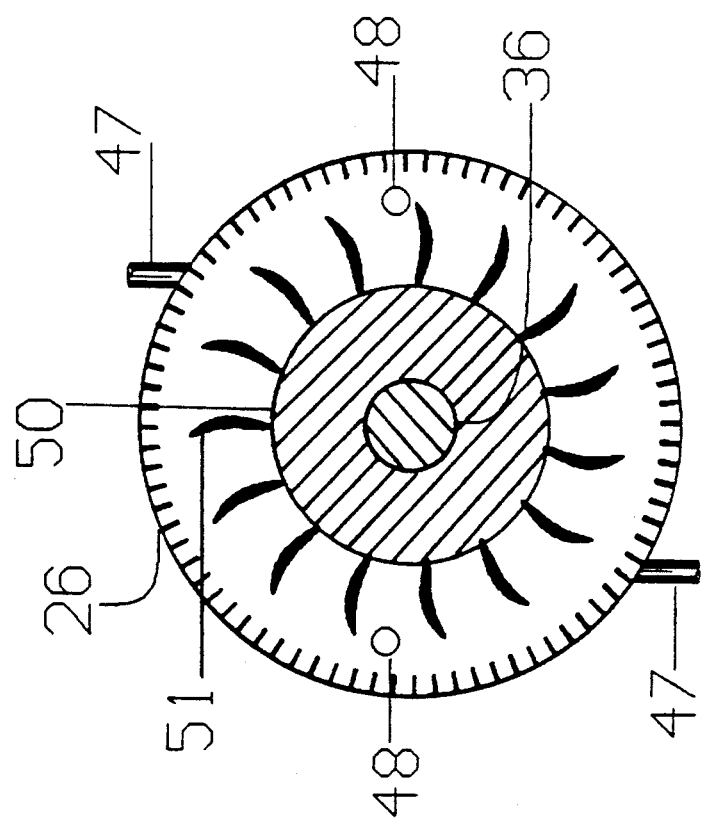
FIG. 4 "PRIOR ART"
FIG. 4A

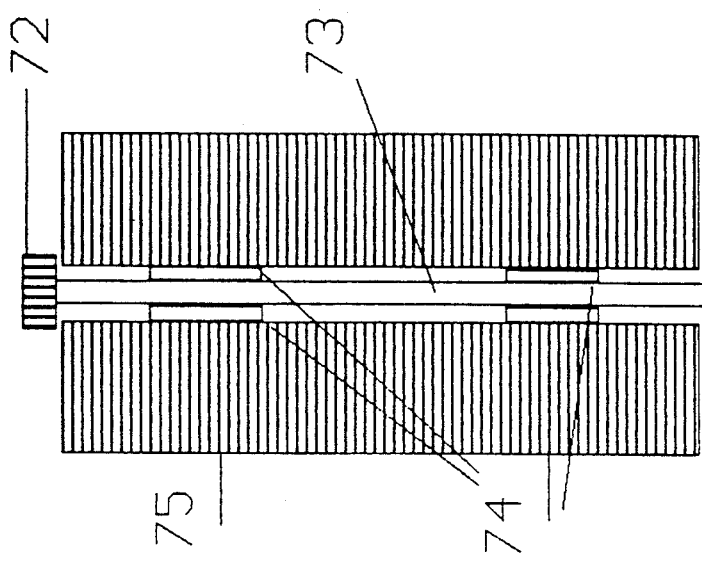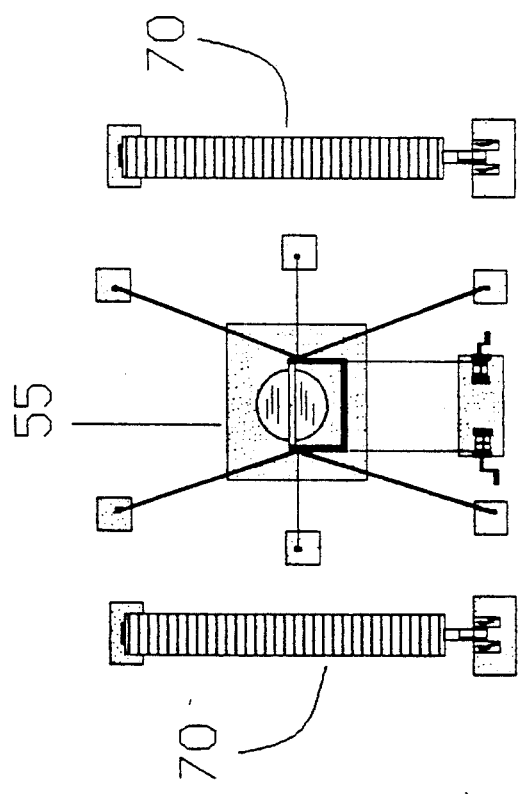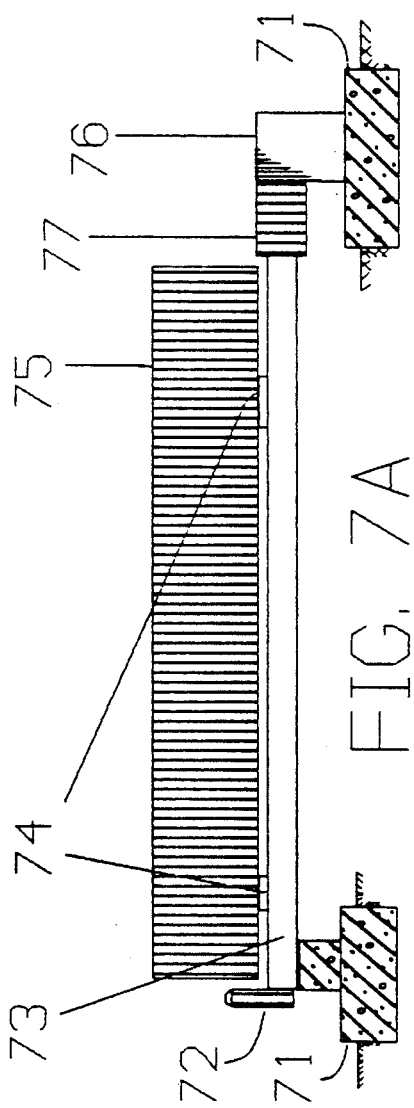

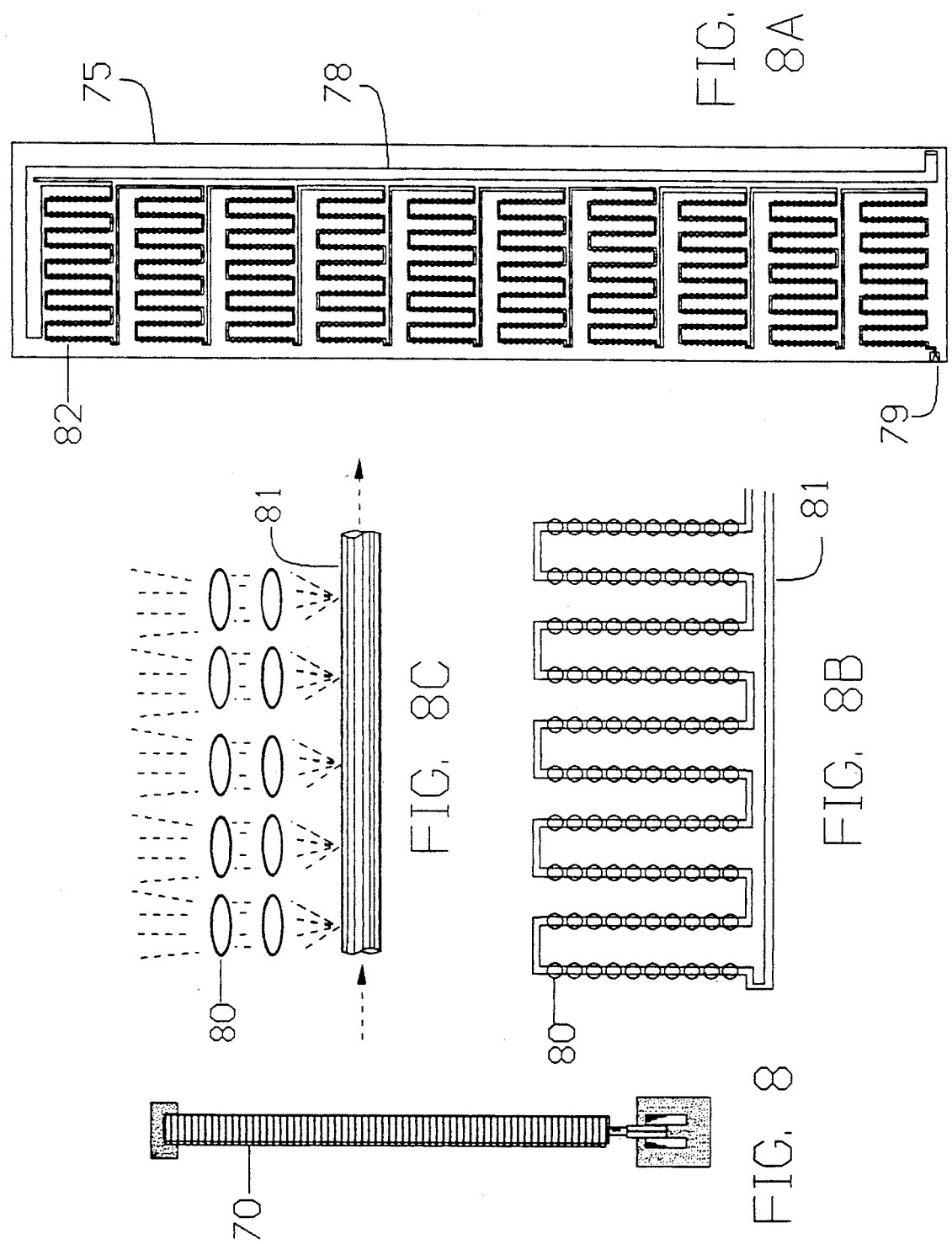

EPCON ENERGY FIELD SYSTEM AN ENERGY PRODUCING CONGLOMERATE (EPCAN) SYSTEM USING WIND ENERGY, SOLAR PANELS, AND STEAM TURBINES

CROSS REFERENCE TO RELATED INVENTION

Patent number: 4,926,061
Date of Patent: May 15, 1990
Appl. No.: 229,229
Name: WINDTRAP ENERGY SYSTEM
INVENTOR: Jose L. Arreola
Assignee: ECM International Inc.

STATEMENT AS TO RIGHTS TO INVENTION MADE UNDER FEDERALLY SPONSORED RESEARCH AND DEVELOPMENT

This system was not developed under any federally funded sponsorship for Research and Development.

BACKGROUND OF THE INVENTION

1. Field of the Invention

The present invention relates to the production of electrical power and more particularly to a field of energy systems that harness both wind and solar energy regulated by a system controller.

2. Description of the Prior Art

Windmills have been used for a great many years to generate electricity. The installation of windmills in arrays in fields has produced substantial energy and has provided an alternative means for communities to obtain electrical power. This approach has shown some promising possibilities as to a large energy source that is reliable. On the other hand, the design of the present wind farms results in costly maintenance and a lack of direct and immediate correlation of energy output to energy load needs.

Since 1974 a considerable amount of effort has been applied to wind farms due to the energy crunch during the decade. The importance of energy and the control of energy resources became quite evident during the Gulf War with Iraq. Energy has become a critical need and the supplier a critical player in world economics.

The prior art has also included wind farms although efficient when the wind speeds reach a significant speed, do require specialized heavy equipment to install and maintain. Furthermore, in areas in the world that have a strong wind base, extreme weather conditions are also encountered which can and do damage to both large and small systems alike.

In the past little effort has been placed into the research and development of multi functional systems that can be shipped to remote village locations, installed without heavy equipment, respond to demand power loads, designed for ease in maintenance, overall ease in installation, protective measures in the event of severe wind conditions, and finally the protection of bird wild life.

Examples of prior art with elements similar in part to the invention being presented are: Trigilio, U.S. Pat. No. 4,551,631 teaches the use of wind and solar energy to generate electricity. Lane, U.S. Pat. No. 4,213,303 teaches the use of a sun tracking lens and a boiler to generate electric power. Wiedemann teaches the use of solar energy, wind energy, wave energy, sea water energy, steam turbines, and electric generators in combination to convert, use, and store energy.

SUMMARY OF THE INVENTION

The invention provides for a wind, solar, and natural gas energy system which utilizes teachings of prior arts but configures the physical structure, electronic design, and transporting capability in a highly efficient and cost effective manner.

The invention as claimed herein is a response to the immediate above mentioned need having world wide implications.

In accordance with this invention, generally stated, a modified windtrap energy system, having added to it a split shaft, set on both sides into the of the electrical generators, which receive its torque from the windtraps or the steam turbines Both the primary shaft supported by windtrap units and the secondary or extended shaft supported by the steam turbines fit directly into the neck housing of the induction generator pulley.

A single non split shaft is also contemplated in this invention where either the wind power and/or steam power drives the induction generator flywheel.

In the case of the split shaft, activation of the wind driven shaft capability to drive the generator flywheel or activation of the steam driven shaft capability to drive the generator flywheel is controlled by magnetically activated rods within the neck of the. Both can be activated at the same time.

An antenna resides on top of the shaft of each windtrap unit. A signal can be sent from the system controller to activate either the wind shaft or the steam shaft or both by radio signal transmittal to all the windtrap units in the field. Input into the system controller is wind, light intensity, and load requirements.

Another object of this invention is to provide an efficient solar steam generating unit utilizing pairs of glass lenses in arrays of 10 but not limited thereto, so constructed that the focal point of the lenses concentrates on an aluminum, copper, or other heat conductive tubing filled with water.

Ten sets of arrays of lenses, but not limited to, with a mesh foundation and cooper, aluminum, or other heat conductive metal piping make up a solar panel unit. A solar wing consists of ten sets of solar panel units, but not limited to, connected together by pipe fittings. A solar energy unit consists of two panels. Each wing of the solar energy unit is connected to the structural frame which is positioned by a mechanical motor supported by an onboard solar unit controller. When activated the controller receives readings from the solar eye, assisting the mechanical motor to position the solar panels for maximum solar exposure. Through the heating of the tubing, the water is converted to steam and passes via tubing to the windtrap steam turbines.

The water pumps are not activated to the required pressure nor is the solar energy unit unless the system controller determines that conditions are right for solar power. Similarly, if load requirements do not necessitate additional power, the system controller will not activate the water pumps nor the solar energy units. Once the solar panels are no longer required or if the wind conditions are prohibitive, then the controller sends a signal to the on board solar system controller to position horizontally on the ground support foundation.

Another object of this invention is to utilize solar parabolic collectors of prior art that can produce adequate solar steam in support of at least four windtrap steam units. The onboard controllers for the solar parabolic collectors units are activated by the system controller in a similar fashion as previously discussed for solar panels. Solar parabolic collector units which have the ability to position themselves on a ground foundation with the concave surface facing down in the event of inactivity, maintenance, or high wind conditions will only be considered to maintain integrity of the object of this invention.

Another object of this invention is to utilize existing natural gas steam boiler prior art technology as an integral element in this energy system. The natural gas steam boiler or boilers is or are activated only if the load demand is greater than what both the wind and solar power can provide. Steam is introduced into the piping network through one way check valves. Once the load requirement has been reduced, the system controller deactivates the natural gas steam boilers.

Another object of this invention is to provide a clean and pollution free energy source that would not effect the ecological balance.

Another object of this invention is to provide a means of transporting the system elements to a remote site and give the ability to the purchaser to install the system themselves without any heavy equipment.

Another object of this invention is to provide a means of protecting the system if severe weather conditions arise.

Another object of this invention is to provide a means of maintaining the system in an efficient and self directed manner.

Other objects of this invention will be apparent to those skilled in the art of wind and solar system technology in light of the invention description that will follow in the associated drawings.

BRIEF DESCRIPTION OF THE DRAWING

Turning now to the drawings in which a presently preferred embodiment of the invention is illustrated.

FIG. 2 shows the shaft connectors and the pulley as well as the induction generators.

FIG. 2A shows a more detailed view of the shaft connectors and the pulley as well as the induction generators.

FIG. 4 shows the steam turbine housing.

FIG. 4A shows the internal view of the steam turbine with its vanes.

FIG. 7 shows a total configuration of one of the preferred embodiments consisting of the windtrap unit and two solar energy units.

FIG. 7A shows the down position of the solar energy unit as it rests on its foundation.

FIG. 7B shows the functional position of the solar energy unit as it is ready to support steam generation.

FIG. 8 shows the top view of a single solar energy unit as it rests on its foundation.

FIG. 8A shows the 1,000 dual lenses organized in sets of a 100 per panel and heat conductive piping that constitute a solar wing.

FIG. 8B shows the 100 dual lenses organized in arrays of 10 which constitute the solar panel unit.

FIG. 8C shows the combination of two lenses with a focal point of light to be directly onto the heat conductive piping.

DESCRIPTION OF PREFERRED EMBODIMENT

This invention can be more readily understood by reference to the drawings as well as cross reference to a prior art in which:

PAGE 1 and 1A OF DETAIL DESIGN

Figure 1:
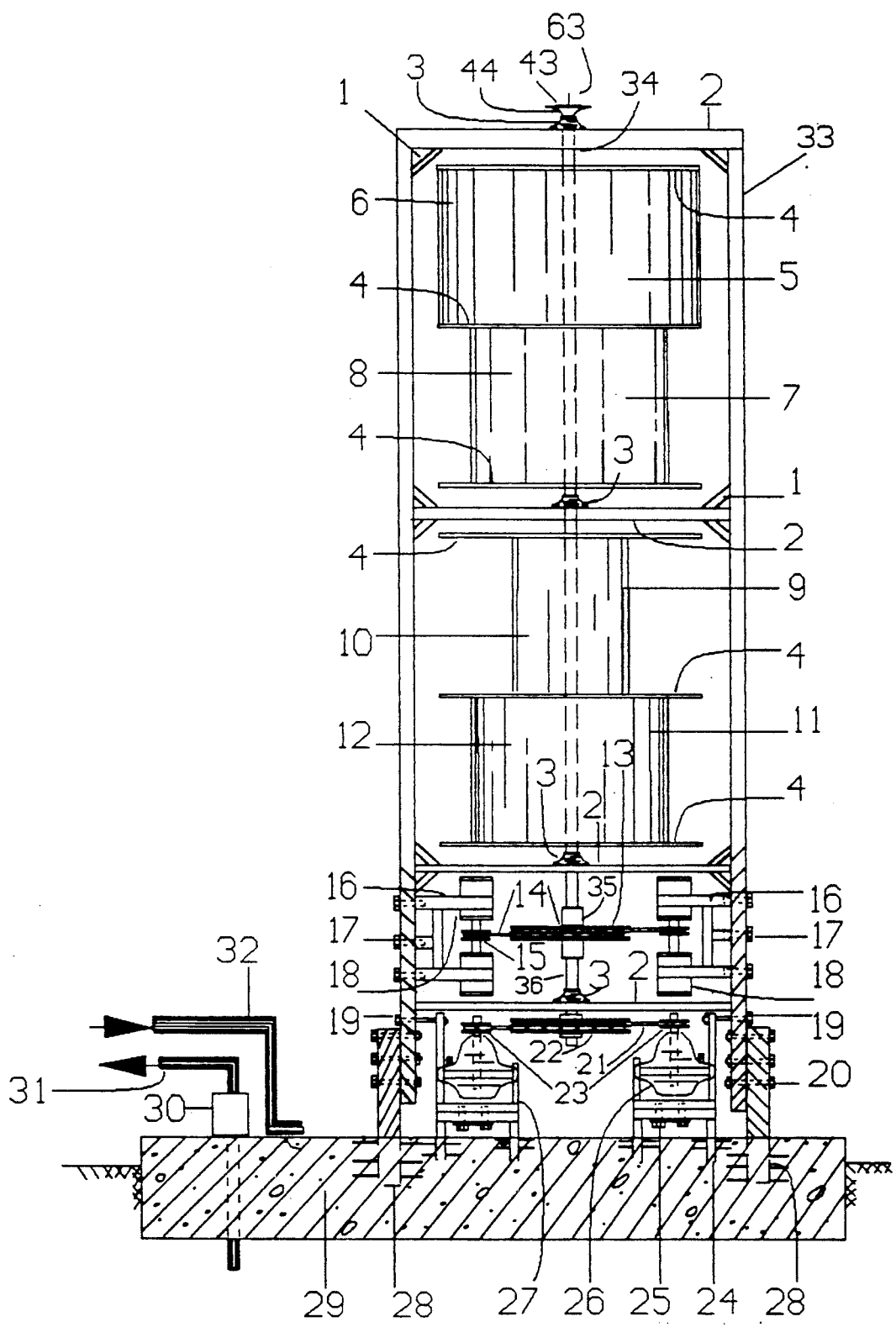
FIG. 1 shows the side view of the modified windtrap energy system without the winch structure along with the water pump with water and steam piping.

FIG. 1 illustrates the preferred embodiment of a wind driven assembly as presented in this invention. Modifications have been applied to the previous art by installing steam turbines that either assist in the generation of torque on the shaft or completely take over the generation of torque on the shaft to produce electricity by means of induction generators.

The other elements of the windtrap energy system as illustrated in the prior art such as the winch structure, electrical components, superconductivity, and breaking mechanism are not shown but are utilized in this invention.

Reference to those items should be made to the original patent.

Repeating in part what was originally stated in the prior art, two vanes 5 and 6 along with their respective disk plates 4 make up a windtrap. In this preferred embodiment of four windtrap units. Vanes 7 and 8 along with the two disk plates 5 make up the second windtrap. Vanes 9 and 10 along with the two disk plates 4 make up the third windtrap. Vanes 11 and 12 along with the two disk plates 4 make up the forth windtrap.

This invention does not show the three windtrap configuration of the prior art. It is suggestive but not limited to only the four windtrap configuration and may replace the four unit with the three unit. The intent of this preferred embodiment was to select the most powerful configuration.

FIG. 1 shows also the structure of the wind driven assembly. The structural frame 33 is supported by braces 1 and has four structural frame cross members 2.

The structural frame 33 is attached to the support 28 by three bolts 20. The two outside bolts 20 are removed whenever the windtrap assembly is to be lowered. The structural support beam 28 is implanted in reinforced concrete foundation 29.

The modified windtrap energy system built according to the invention in FIG. 1 has the shaft 34 attached to the frame using a baring housing 3. This shaft is supported by a series of baring housing 3 and a primary pulley neck housing 35. The shaft is split within the neck housing. A single complete shaft is also contemplated in this invention.

The primary shaft pulley 13 has two belts 14 that attach it to the generator pulleys 15. The diameter of the primary shaft pulley and the generator pulley produces a speed ratio in advantage to the generator pulley. The induction generators 18 are braced to the structural frame 33 by generator supports 16 which are mounted to the structural support 33 using bolts 17.

The modified windtrap energy system has a secondary pulley 22 which is attached to the pulleys of the steam turbines 23. Again the diameter of the steam turbine pulley produces a speed ratio disadvantage to the secondary shaft pulley. Due to the power exerted by the steam and the resultant speed with which the turbine pulley can rotate, and the fact that the there is a ratio advantage for the induction generator.

The steam turbines 26 are stabilized by a turbine support frame 27 that attaches to the structural frame 33 using bold 19 and th the foundation support plate 24 by attach bolts 25.

The steam lead piping 32 carries the steam to the steam turbines. The actual piping is not shown. A water well pump 30 on site provides the water and the necessary water pressure to transfer the water through piping 31 to the steam generating unit, which is not shown.

The activation of shaft to primary pulley torque transfer is controlled by the system controller which sends a radio signal to all units. Each unit has a radio receiver 63 mounted on top of the shaft 34. A photo-voltaic battery charger 43 is also mounted on top of the shaft 34 in order to charge the internal shaft batteries that are not shown.

Since a single shaft is also contemplated in this invention, the radio receiver and the photo-voltaic unit would not be required for a single shaft configuration.

Figure 1A:
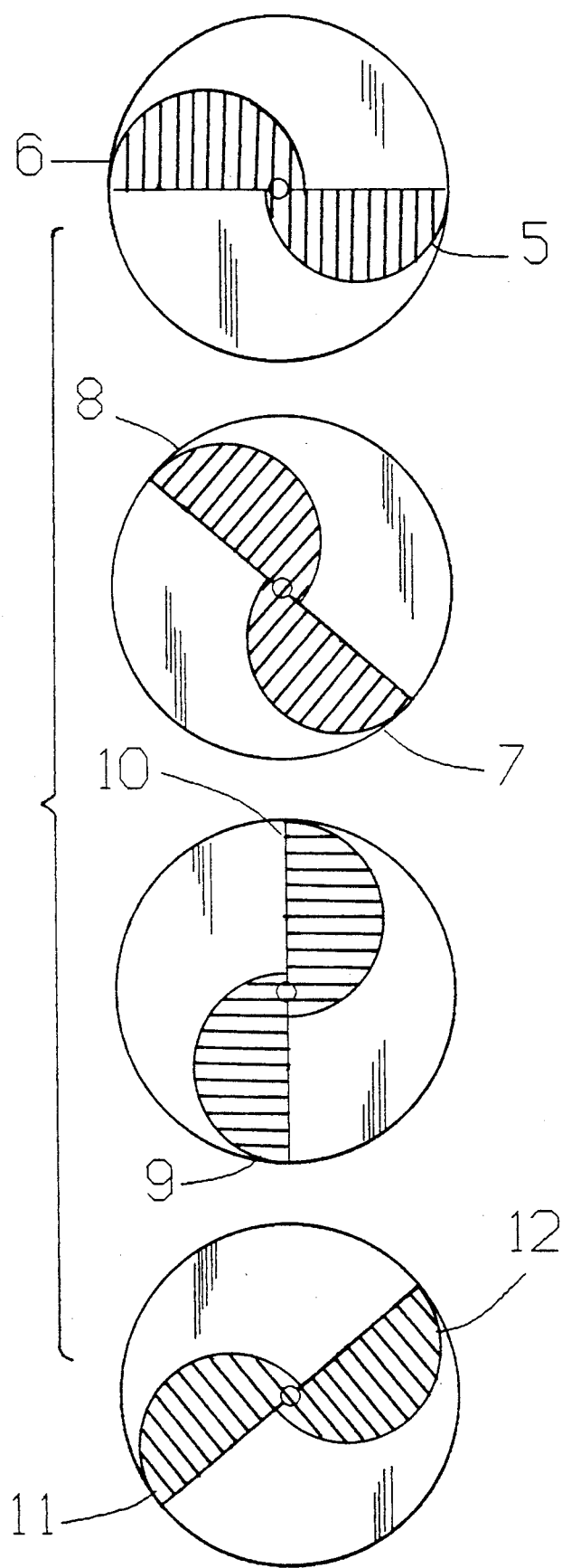
FIG. 1A shows the preferred embodiment of the windtrap vanes and their relative position to each other.

FIG. 1A show a bird's-eye view of the preferred embodiment windtrap vane surfaces positioning relative to each other that provides for a highly balanced and efficient configuration.

Each vane is 45 degrees apart from the other and the combination of vanes provides for intercept of wind kinetic energy from any direction. The wind kinetic energy is transferred to the windtrap device at point of initial impact and at secondary impact resulting from the flow through effect. The force of the wind against the vanes of the windtrap device results in rotation of the shaft with a significant torque to support high kilowatt generation in producing electrical energy. The vanes involved are (5,6), (7,8), (9,10), and (11,12).

PAGE 2 OF DETAILED DESIGN

FIG. 2 shows a more detailed view of the preferred embodiment of the primary pulley 13 attached to the primary wind driven shaft 34 and the secondary steam driven shaft 36. The secondary steam shaft is shown connected to a baring housing. The primary pulley 13 has two belts 14 that are connected to the induction generator pulleys 15. The connection to the modified windtrap energy system is not shown.

In FIG. 2 the preferred embodiment of the invention shows four induction generators 18. This does not exclude the possibility of utilizing only the generator.

FIG. 2A shows a more detail view of the connection between the wind driven shaft 34 and the steam driven shaft 36 to the primary pulley 13.

The inside diameter of the primary pulley 13 is not shown to view the separation of the two shafts 34 and 36. The primary pulley neck coupling 35 has within it connectors 37 that are used to activate the pulley 13 and thus transfer the kinetic energy of either the wind shaft 34 or the steam shaft 36 to the belts 14 that activate the rotation of the induction generators.

A single shaft is also contemplated in this invention without the controls discussed and directly connected to the primary pulley 13 and secondary pulley 22.

PAGE 3 OF DETAIL DESIGN

Figure 3A:
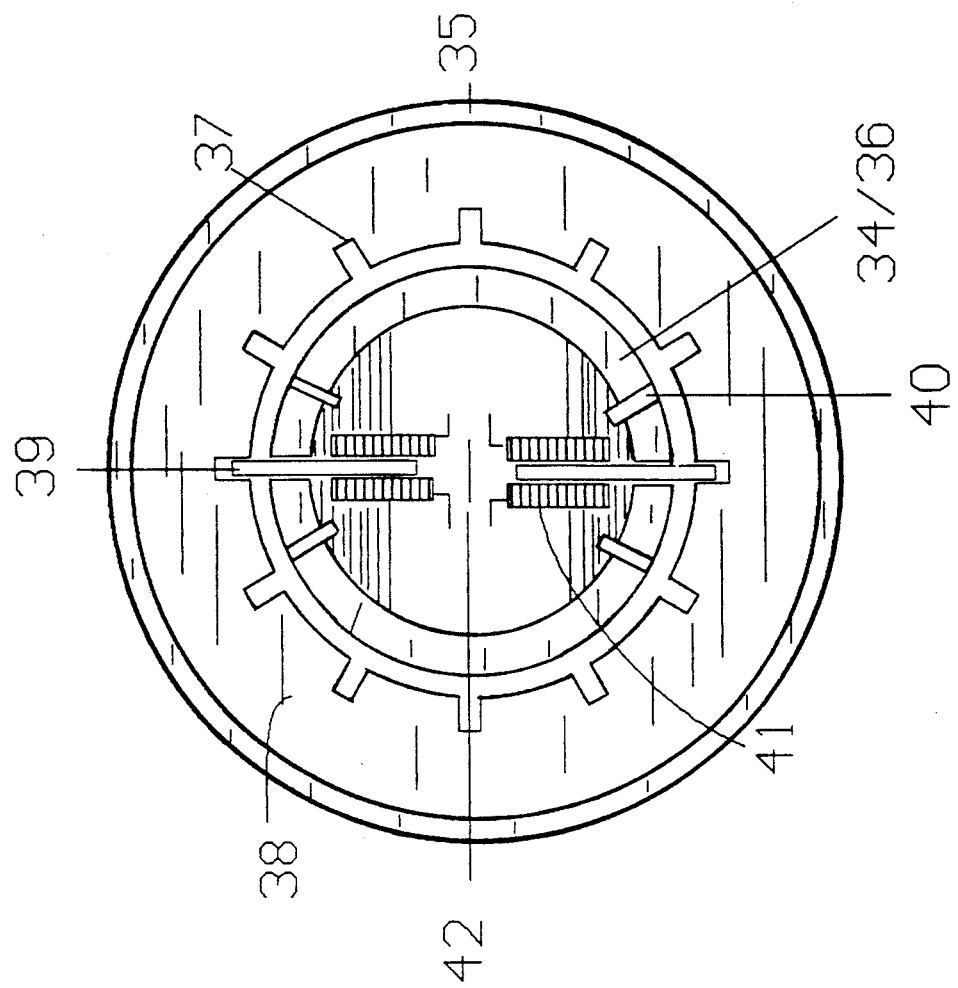
FIG. 3A shows an internal view of the shaft connector mechanism.
Figure 3:
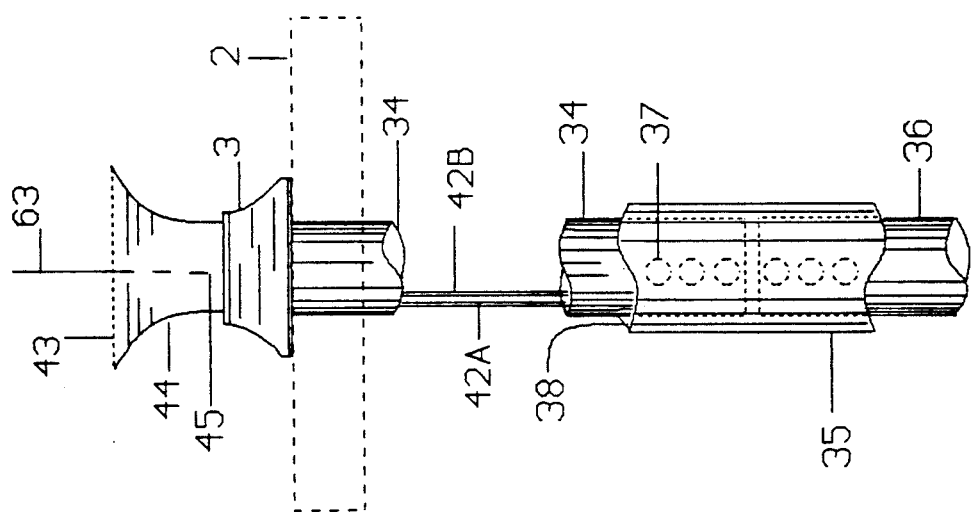
FIG. 3 show the shaft and connector mechanism to the pulley.

FIG. 3 shows a detail description of the shafts, 34 and 36 within the primary neck coupling 35. The connectors 37 are shown in series within the neck coupling 3$. Activation wiring from the wind driven connectors 42A and the steam driven connectors 42B extend up through the shaft 34 to a circuit and battery pack not shown. Energy for the circuit is stored in the batteries and is recharged by the photo-voltaic unit 43 attached to the end of the shaft 34. The circuit is controlled by a radio frequency receiver 63. Signals are sent to each unit in the EPCON system by a radio transmitter connected to the system controller which has internal logic to activate either the wind kinetic energy element to drive the induction generators or the kinetic energy of the steam turbines to drive the generators.

FIG. 3 shows the photo-voltaic unit attached to the shaft 34 by means of connectors 44. The electrical power generated by the photo-voltaic unit is transferred to the batteries via electrical lines 45.

FIG. 3A shows a more detail view of the connectors within the shaft as well as the connectors withing the primary pulley neck coupling 35. A magnetically activated rod 39 is controlled by magnetic induction of a coil. When there is an active current flow in the out direction of the coil 41, the rod 39 is forced out and into one of the connectors 37. This engages the pulley.

When the current flow is in the opposite direction in the coil 41, the magnetically induced rod 39 is forced in and the pulley is disengaged.

The connectors 37 are within cylinder inserts 38. An insert plate 42 prevents the rods from excess movement in reverse mode. The internal connectors are attached to the internal part of the shaft 34 and 36 by rivets 40.

PAGE 4 OF DETAIL DESIGN

FIG. 4 shows the steam turbine that will be utilized in the preferred embodiment of this invention. The steam turbine shaft 36 is rotated to produce torque on the steam turbine pulley not shown.

Two inlet pipes 47 provide the necessary directional steam for the steam turbines. Two steam plates 49 provide for an unsealed compartment for the directional steam power. A strong metal housing 26 provides for the structural support of the steam turbines which are under extreme temperature and pressure conditions. There are two outlets 48 that permit steam to dissipate from the steam turbines. Piping connected to either the steam input 47 or outlet 48 is not shown.

FIG. 4A shows an inside view of the steam turbine. The steam turbine shaft 36 has an internal pulley 50 on which are connected turbine rotors 51 on which the directional steam produces the torque necessary for steam turbine shaft and attached pulley to rotate. As in FIG. 4, the input valves 47 are shown along with the outlet 48. The turbine housing 26 consists of a lattice for thermal and pressure absorption.

PAGE 5 OF DETAIL DESIGN

Figure 5:
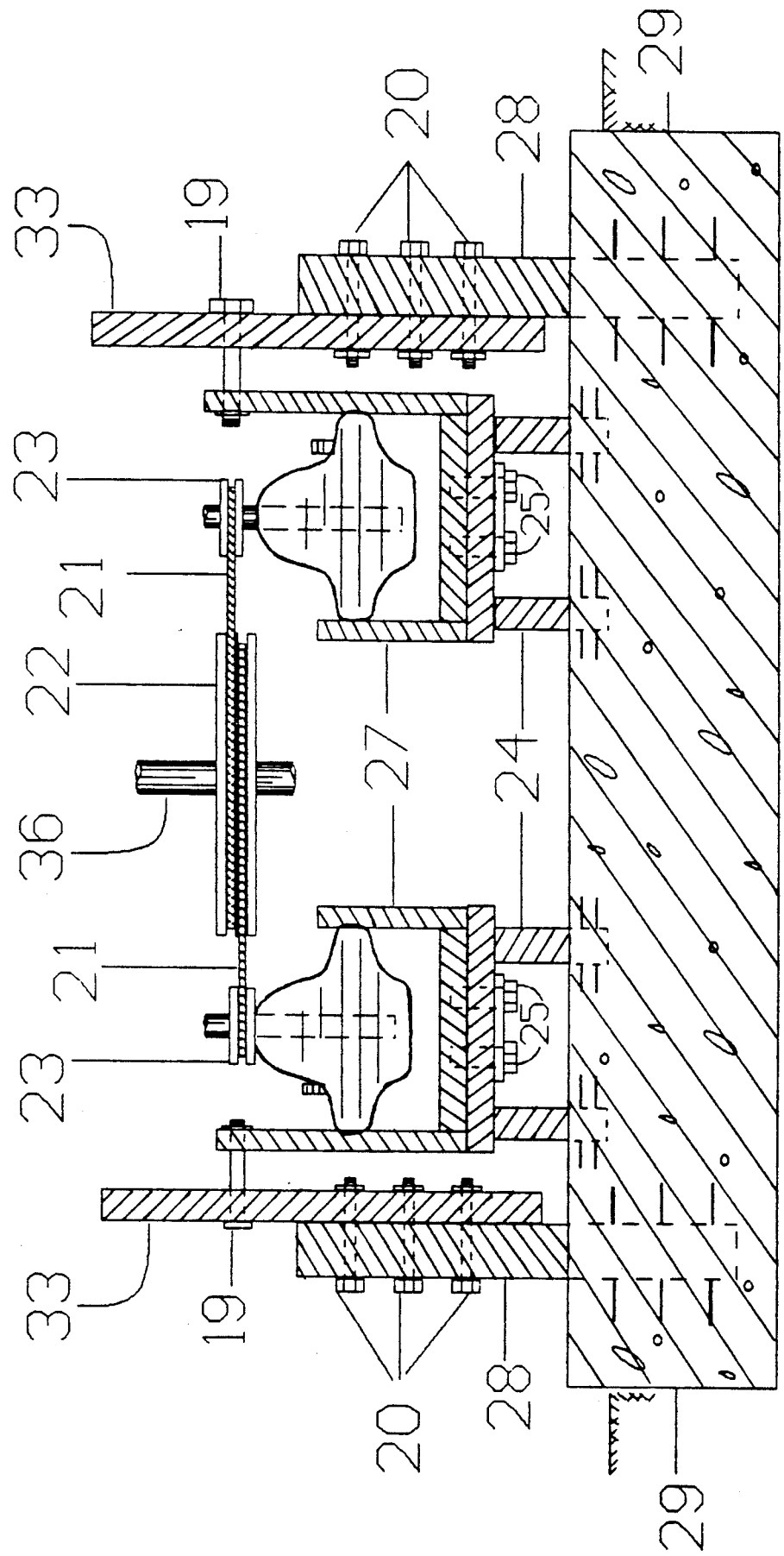
FIG. 5 shows the structural supports of the steam turbines.

FIG. 5 is a more detailed description of the connection of the steam generators to the windtrap structure. In addition to stability, it was necessary to design the connection in such a way so as to be able to take the system down in the event of severe weather conditions or maintenance.

For the windtrap assembly to be taken down, remove the two bottom structural bolts 20, and the turbine plate bolts 25, as well as the bolts not shown that hold the cables for the system that are also not shown.

For replacement of second shaft belt 21, bolts 19 are to be removed and bolts 25 are to be loosened.

For replacement of the primary shaft belt 14 not shown, bolts 19 and 25 are removed and the shaft 36 is removed from the primary pulley neck coupling 35 and the generator support 16 not shown uncoupled.

For stability of the preferred embodiment of the modified windtrap energy system, the structural frame 33 is attached to the structural support 28 by bolts 20. The structural supports 28 are embedded into reinforced concrete 29. The steam turbines are stabilized by a turbine support frame 27 which is connected to a turbine support plate 24 by connector bolts 25. The turbine support frame 27 is also connected to the structural frame 33 by a bolt 19. Stability is also established by the belts 21 connecting the secondary pulley 22 to the steam turbine pulley 23 using the shaft 36 for support.

PAGE 6 OF DETAIL DESIGN

Figure 6:
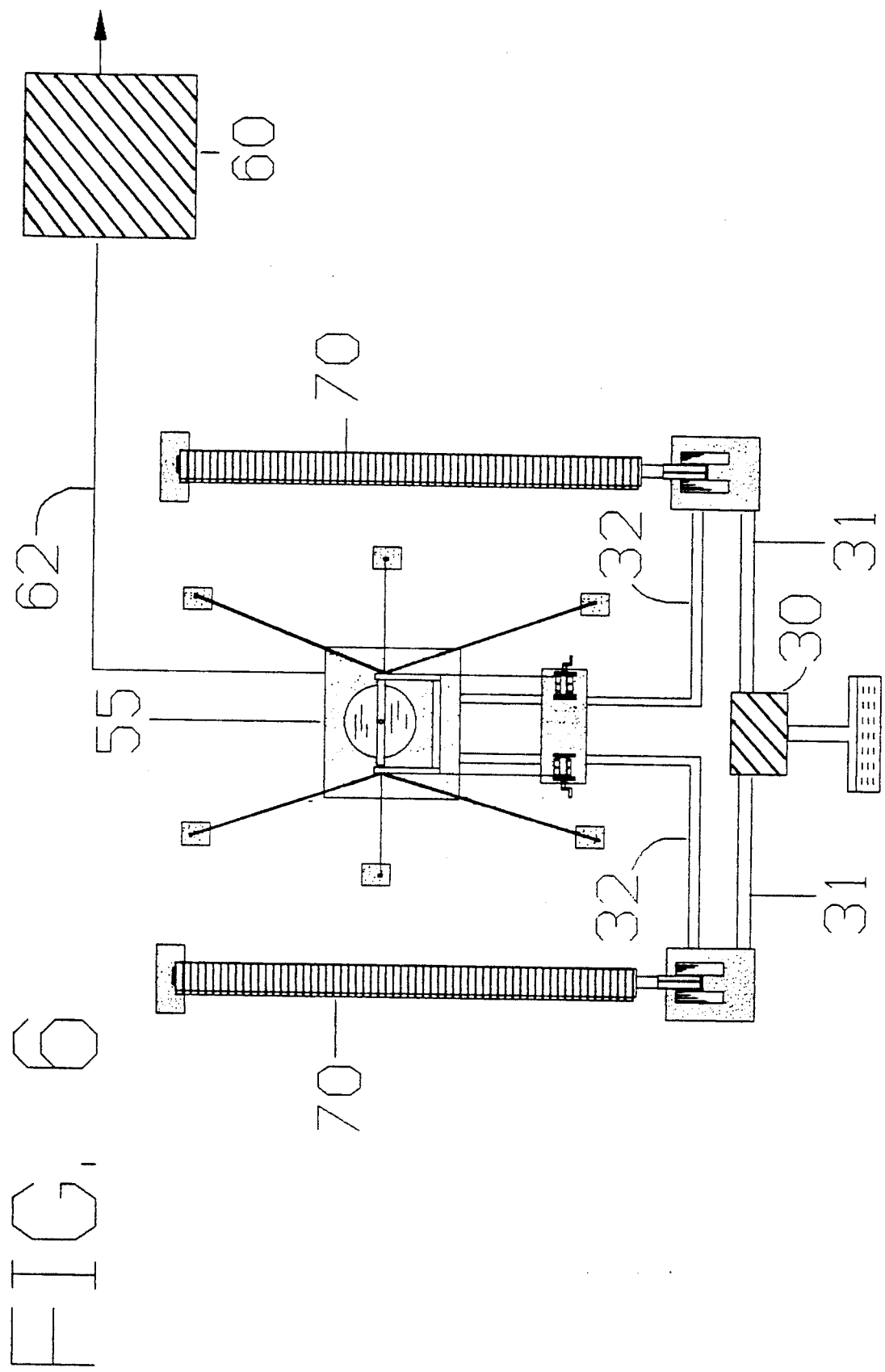
FIG. 6 shows one of the preferred embodiments of the EPCON Energy Field units.
Figure 9:
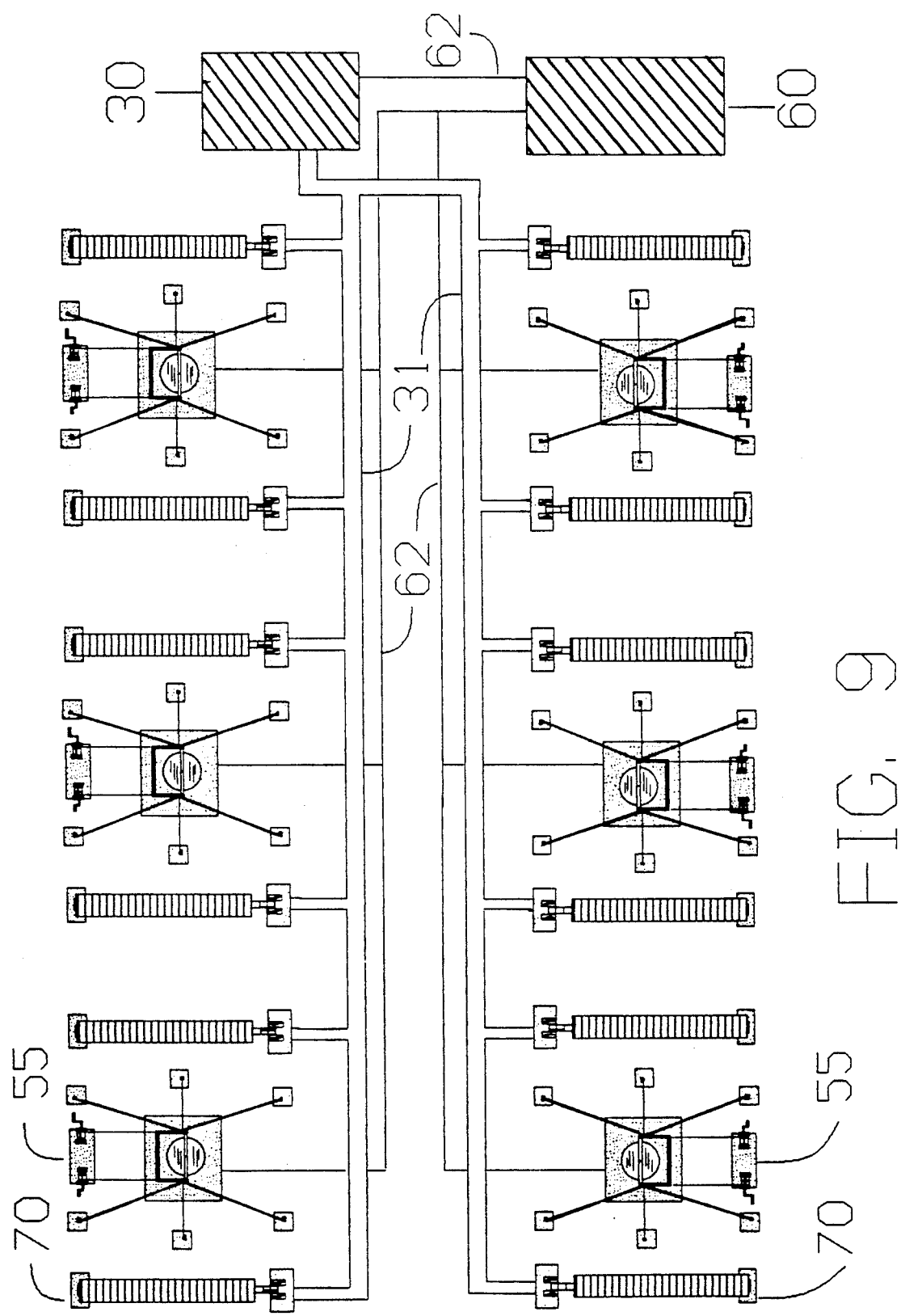
FIG. 9 shows an EPCON system network of the preferred embodiment with EPCON energy units interfaced to a system water resource housing and a system controller, energy storage, and interconnect facility.

FIG. 6 shows the preferred embodiment of the basic unit of the EPCON system. The intent of this invention is to utilize a series of these units to produce a substantial amount of power to support a community or industrial site. The primary element is the modified windtrap energy system 55 which will support four induction generators. Supplemental torque energy will be provided through two solar energy units 70 by generation of steam from water provided by a water pump 30 from a water well. This water will be routed to the solar panel unit by piping 31. The water will be turned into steam as the solar panels are activated provided sufficient sunlight is available. The steam will be routed to the steam turbines of the modified windtrap energy system through piping 32. Resuable hot water to be recycled or used for external purposes in contemplated but not shown in this invention.

The electricity generated will be routed to the electrical control housing 60 through the electrical conduit piping 62. The control wiring that activates the solar energy units is also installed within the conduit piping 62.

It should also be noted that the water pump configuration shown should not imply that each unit has its own water pump but rather a single water pump may support one, some or all of the EPCON system units. Wiring conduit leading from the system controller housing to the pump is not shown.

PAGE 7 OF DETAIL DESIGN

FIG. 7 is another view of the basic unit of the EPCON system unit. The EPCON system unit consists of the modified windtrap energy system 55 and two solar panels 70.

FIG. 7A show the resting position of the solar panel. The solar panel has a reinforced concrete foundation 71 on which the structure rests in a horizontal position. The foundation of the solar panel 73 is attached to a mechanical positioning unit 76 and reinforced by coupling collar 77. Movable braces 74 attach the solar panels 75 to the solar foundation 73. A solar eye 72 is attached to the end of the solar panel, which provides the means of solar light intensity analysis.

FIG. 7B shows the upright and activated position of the solar panel. Once the solar panel has been brought up to this position and the solar panels placed into direct contact with the suns rays, the water pump is activated and stem is generated. Again the device has a reinforced concrete foundation 71 on which the mechanical positioning element 76 rests. The mechanical positioning mechanism 76 controls the movement of the solar structure 73 and the braces 74 for opening up the panels 75. The solar structure has a coupling collar that attaches it to the positioning mechanism unit 76. The solar eye 72 controls the unit by analysis of light intensity.

PAGE 8 OF DETAIL DESIGN

FIG. 8 shows the solar panel unit 70, that in turn will be described in detail by FIG. 8A, and 8C as to the structure of the solar panel itself.

FIG. 8A shows the total solar wing 75 with the preferred embodiment of 1,000 sets of lenses, in arrays of 100 sets of lenses on each solar panel 82. A check valve 79 controls the water permitted to enter the solar panel 75. Steam is generated by the focused light on the piping and exits the solar panel through the steam outlet piping 78.

FIG. 8B shows one of the solar panels 82. The solar panel consists of ten arrays of ten sets of lenses 80 which focus light on either an aluminum or copper piping 81 or other heat conductive material.

FIG. 8C shows that the lenses 80 are two pair which focus the light coming onto the lenses directly perpendicular due to the manipulation of the solar wing by the mechanical drive supported by the solar eye. The light is focused onto the aluminum, copper, or other heat conductive piping 81 as a preferred embodiment of this invention.

Other configurations of lenses that are singular rather then double as well as the number of solar panels per wing and the number of lenses per panel are contemplated in this invention.

PAGE 9 OF DETAIL DESIGN

The EPCON system consists of a series of EPCON energy units. Each unit consists of a modified windtrap energy system 55 and two solar panels 70. Although this drawing only shows two rows of three sets of the EPCON energy units, the intent is to show one possible configuration. Other configurations are contemplated in this invention. Another significant item in the diagram is to show that there would be a single water pump 30 and a single housing for an electrical control system. So while there would only be one system controller, there may be more than one water pump in an EPCON system and this therefore is contemplated in this invention.

Conduit electrical piping lines 62 connect the system controller housing with the water pump facility as well as each and every EPCON energy unit in the field. Electrical lines within each system are not shown that lead from each solar panel system to the conduit piping 62 nor are the electrical lines that come from the electrical generators that return energy in the form of electricity to the control housing.

PAGE 10 OF DETAIL DESIGN

Figure 10:
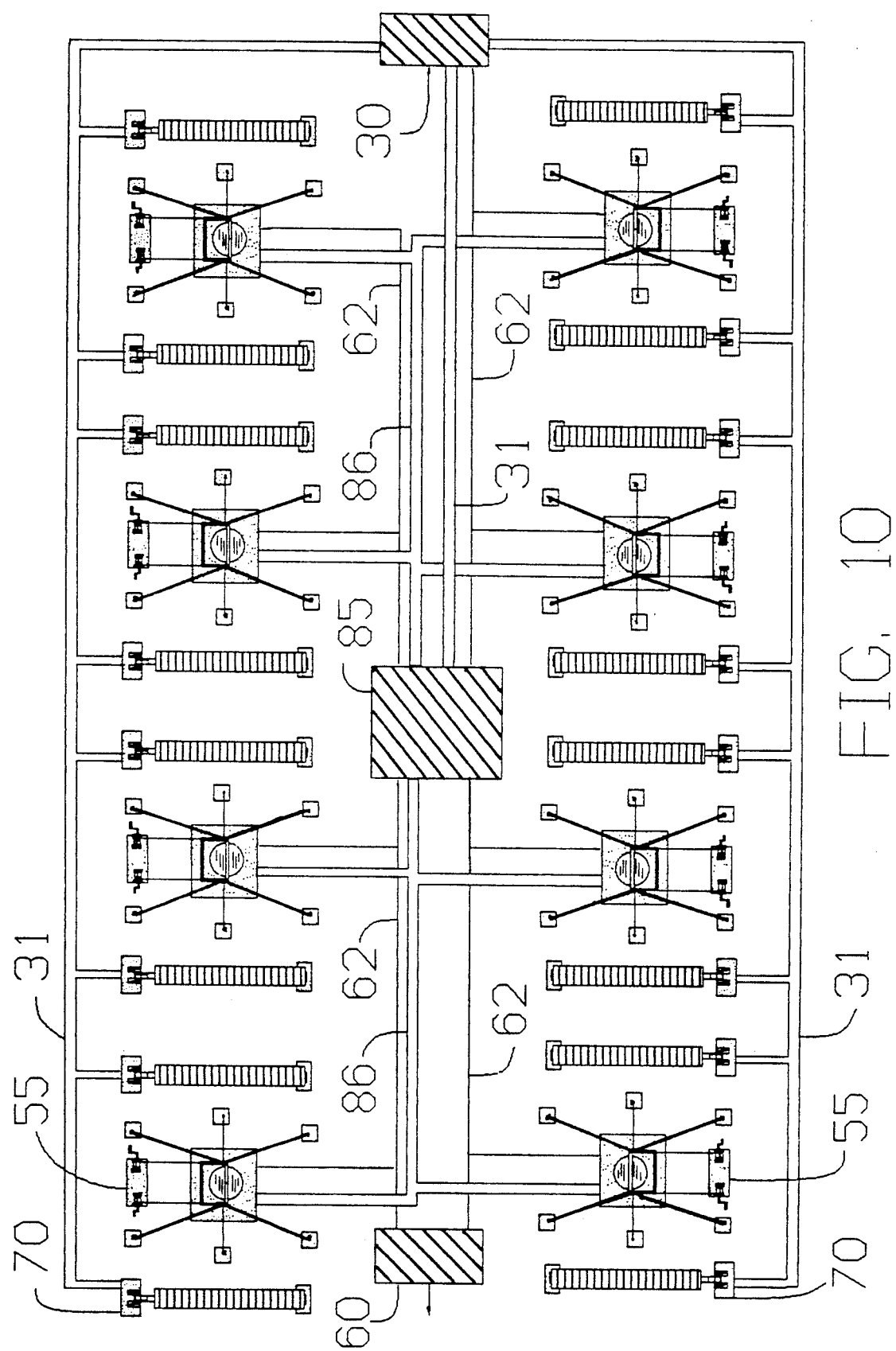
FIG. 10 shows an EPCON system network of the preferred embodiment with EPCON energy units interfaced to a system water resource housing, a natural gas steam boiler housing, and a system controller, energy storage, and interconnect facility.

FIG. 10 shows a secondary preferred embodiment of this invention which utilizes a supplementary natural gas boiler. The diagram is a general overview and since the natural gas boiler is prior art, only the housing is represented and the interconnect shown. Conduit lines 62 lead not only to each EPCON system unit 55 and the water pump housing 30, but also to the natural gas steam boiler housing 85. The electrical conduit lines from each of the modified windtrap units 55 provide for electrical lines that carry the electrical energy to the system controller housing. The water lines 31 lead from the water pump to each solar parabolic collector system as well as to the natural gas boiler. Steam lines lead from the natural gas steam boiler housing to each modified windtrap energy system. Exact interconnect of steam piping to windtrap piping and check valves are not shown but are contemplated in this invention.

The drawing shows one of the possible configurations of the secondary preferred embodiment utilizing a common natural gas steam boiler. The configuration shown here is two arrays of four EPCON energy units but other configurations are contemplated in this invention.

FIG. 11 OF DETAIL DESIGN

Figure 11:
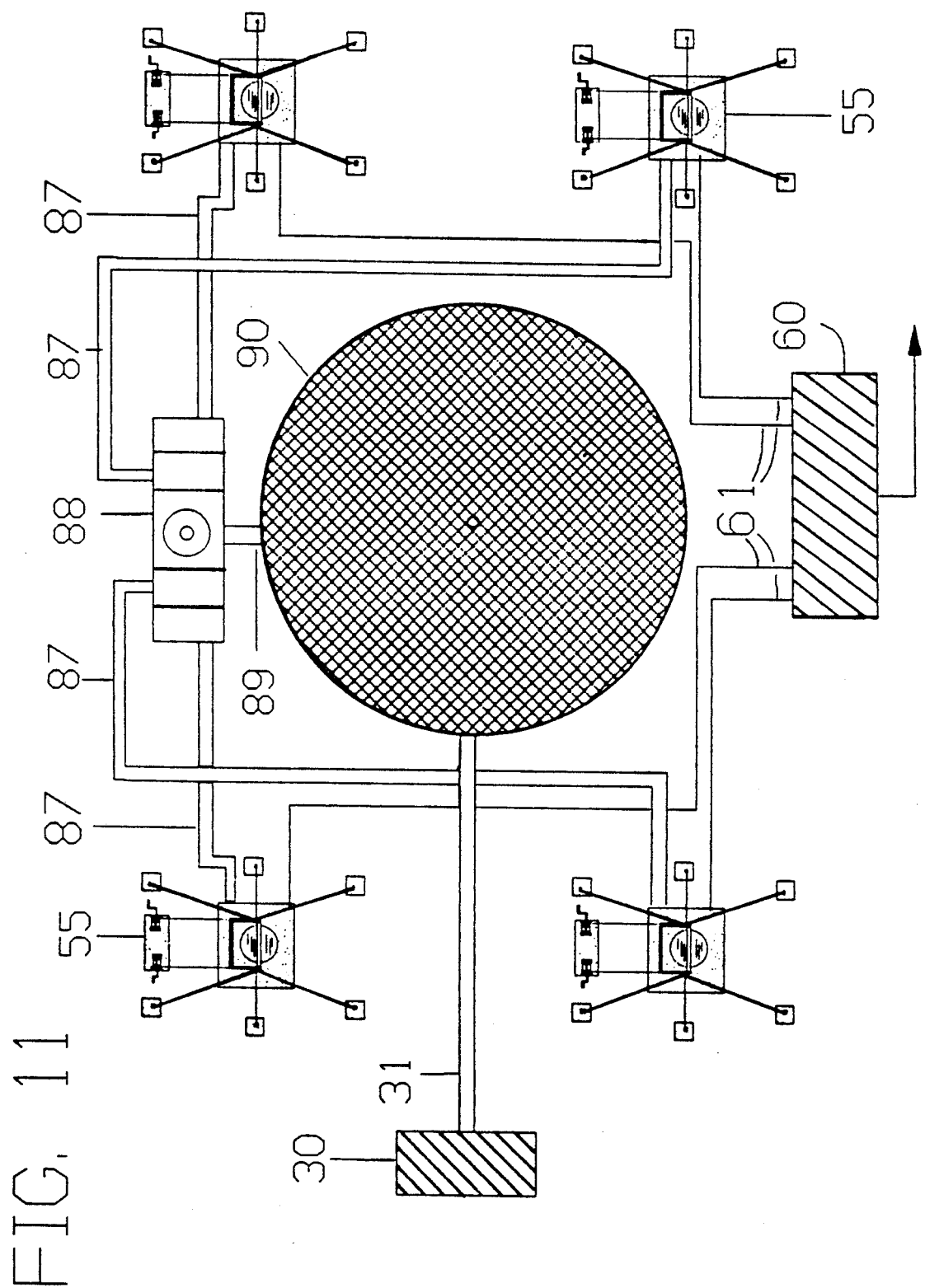
FIG. 11 shows a secondary preferred embodiment of an EPCON energy unit consisting of a single solar parabolic collector in combination with four windtrap energy units.

FIG. 11 shows the second solar energy unit design of a preferred embodiment of this invention. In this design, a solar parabolic collector 90 is coupled to four modified windtrap energy systems 55. An adequate size of a solar parabolic collector 90 is required to support at least four modified windtrap energy system units. A water pump 30 in a housing provides water through piping 31 to the solar parabolic collector system 90. As steam is generated the check valves 88 open and steam is transferred to each of the modified windtrap energy system units 55 through piping 87. The interconnect to the steam turbines is not shown. Electricity is generated by either wind power or steam power and electrical lines carry this electricity to the system controller housing 60 via electrical conduit piping 61.

The configuration shown here is one solar parabolic collector system to four modified windtrap energy system units but other configurations are contemplated in this invention.

PAGE 12 OF DETAIL DESIGN

Figure 12:
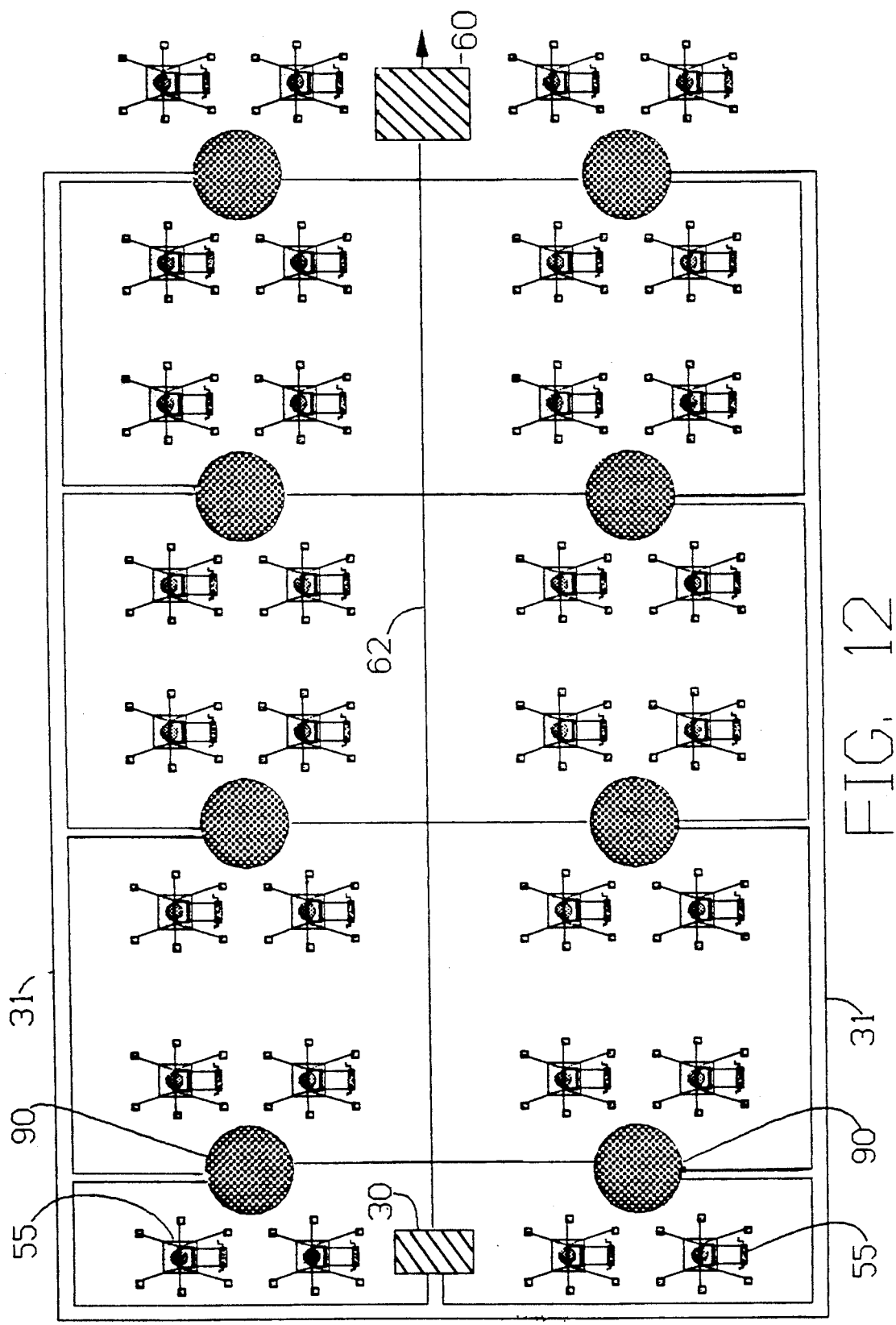
FIG. 12 shows an EPCON system network of the preferred embodiment with EPCON energy units consisting of solar parabolic collectors in union with four windtrap energy units, each energy unit interfaced to a system water resource housing and a system controller, energy storage, and interconnect facility.

FIG. 12 shows an EPCON System shows the secondary unit design of a preferred embodiment of this invention. The diagram show one of the possible configurations of two rows of four EPCON secondary energy units. Each unit consists of four modified windtrap energy systems 55 and a solar parabolic collector system 90. Other combinations utilizing the units specified and their variations are contemplated in this invention.

The EPCON system is supported by a common water pump in a housing 30 that provides water through the water pipes 31 to each of the solar parabolic collectors at the proper pressure. An electrical conduit piping 62 provides for electricity generated by each EPCON unit to be routed to the system controller housing. The same conduit piping also provides for electrical control lines to be routed to each EPCON secondary energy units to control operation.

PAGE 13 OF DETAIL DESIGN

Figure 13:
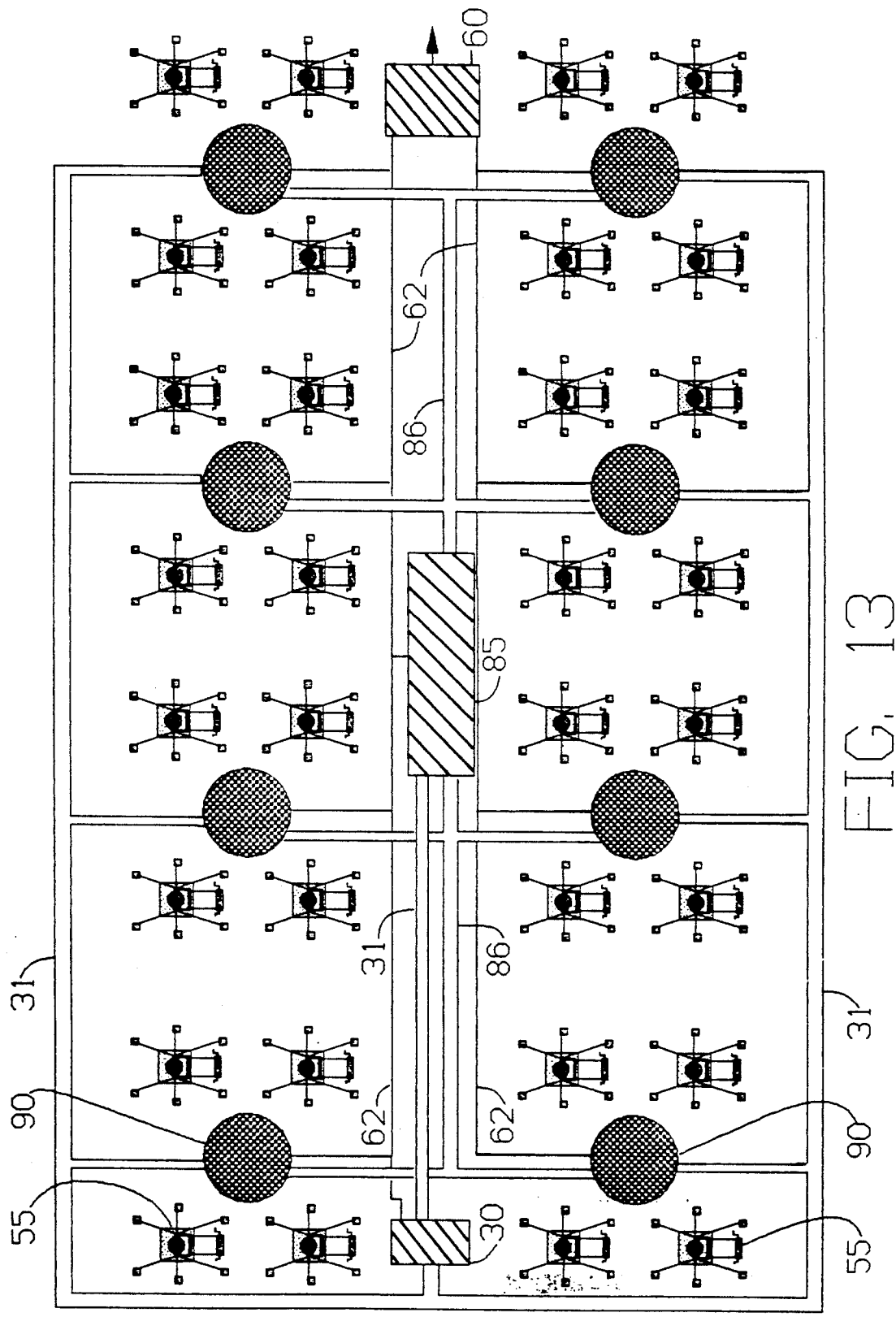
FIG. 13 shows an EPCON system network of a preferred embodiment with EPCON energy units consisting of solar parabolic collectors in union with four windtrap energy units, each energy unit is interfaced to a system water resource housing, a common natural gas steam boiler housing, and a system controller, energy storage, and interconnect facility.

FIG. 13 shows an EPCON system shows the secondary preferred embodiment of this invention utilizing the natural gas steam boiler. FIG. 13 also shows the secondary unit design utilizing the solar parabolic collector system unit 90 and the modified windtrap energy system units. The diagram shows one of the possible configurations of the secondary preferred embodiment consisting of two rows of four basic units. Other combinations utilizing the units specified and their variations are contemplated in this invention.

The EPCON system is supported by a common water pump in a housing 30 that provides water through the water pipes 31 to each of the solar parabolic collectors as well as to the natural gas steam boiler housing 85 at the proper pressure. An electrical conduit piping 62 provides for electricity generated by each EPCON unit to be routed to the system controller housing. The same conduit piping also provides for electrical control lines to be routed from each EPCON secondary energy units to control operation. An electrical conduit line is also connected to the natural gas steam boiler housing to control its operation by the EPCON controller.

PAGE 14 OF DETAIL DESIGN

Figure 14:
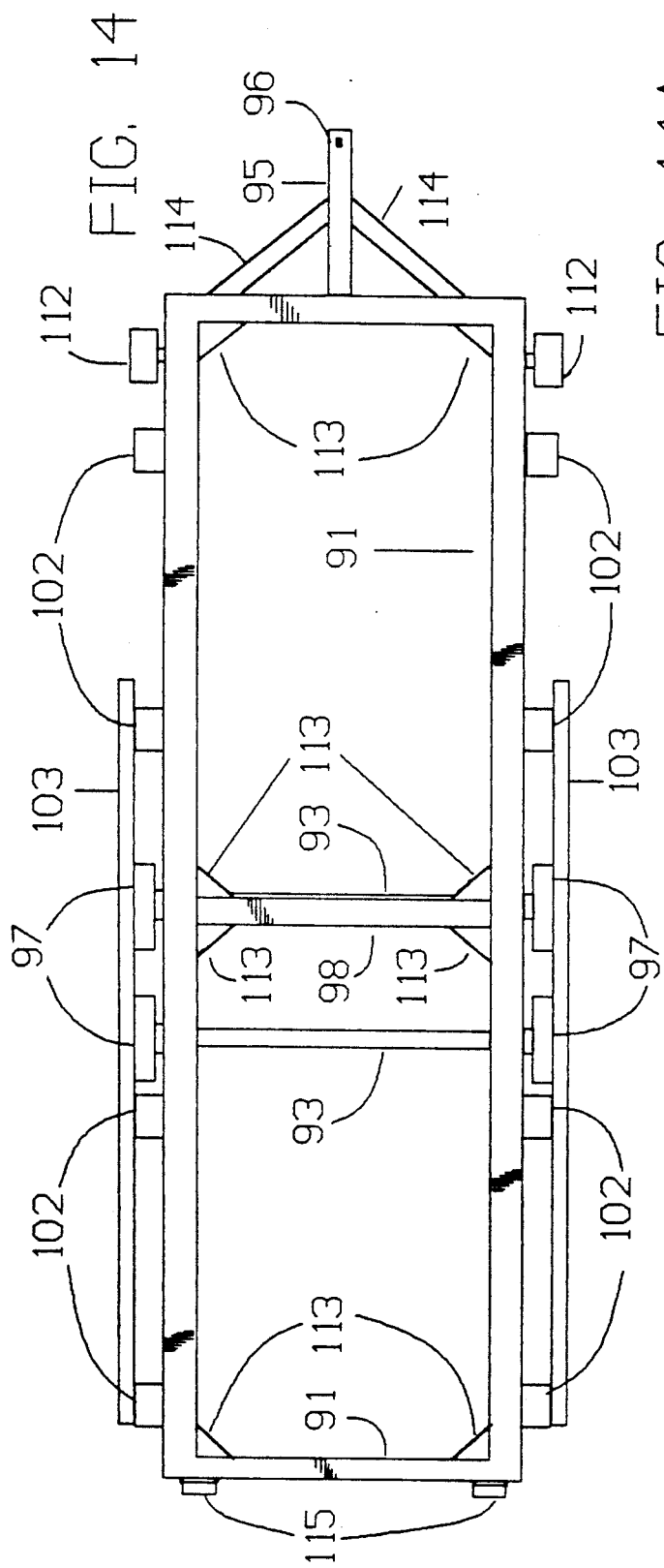
FIG. 14 shows the top view of the transporter.

FIG. 14 show the top view of the transporter with wheels 97 attached to an axle 93 that in turn is attached to the transporter frame 91. The braces are not shown. In the middle of the transporter is a cross member 98 to provide stability. Additional stability is provided by the triangle braces 113. The transporter arm 95 provides a means to connect the transporter to pickup, jeep, or truck. The transporter arm braces 114 are provided for stability. The transporter latch 96 provides for connection to the vehicle. The transporter winch frame 103 provides for a winch pulley at the top that is not shown. The adjustable front wheel 112 is used only for stabilization of the transporter when not in shipment. Running lights 115 are also provided.

Figure 14A:
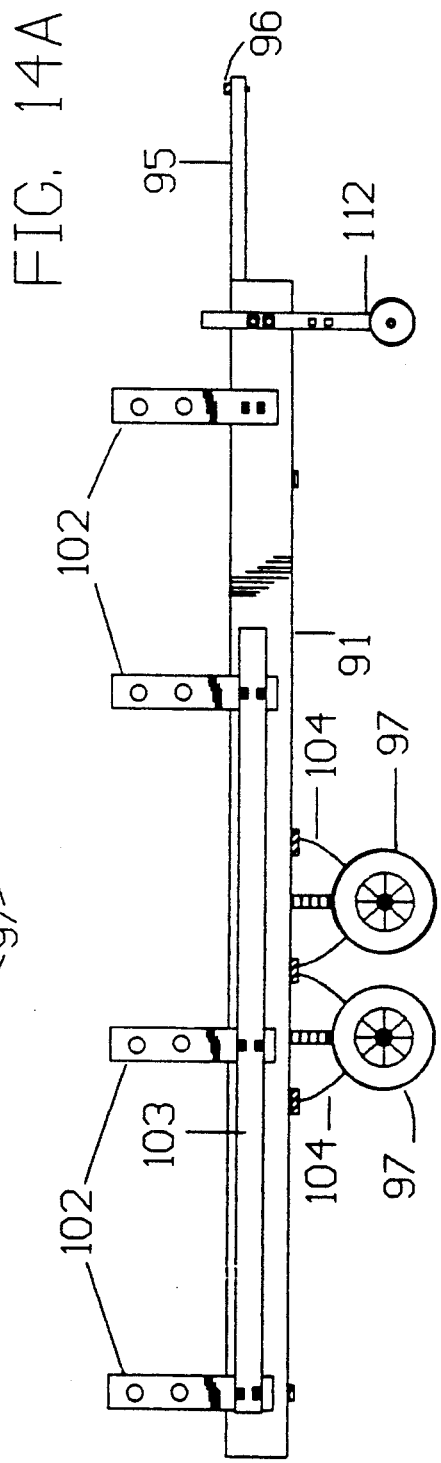
FIG. 14A shows the side view of the transporter.

FIG. 14A show the side view of the transporter. In addition to the items described in FIG. 14 the transporter has side mounts 102 that are used to hold and stabilize the windtrap unit and the windtrap winch structure. FIG. 14A also shows the springs 104 that attach the wheel and axle to the frame 91 of the transporter.

PAGE 15 OF DETAIL DESIGN

Figure 15A:
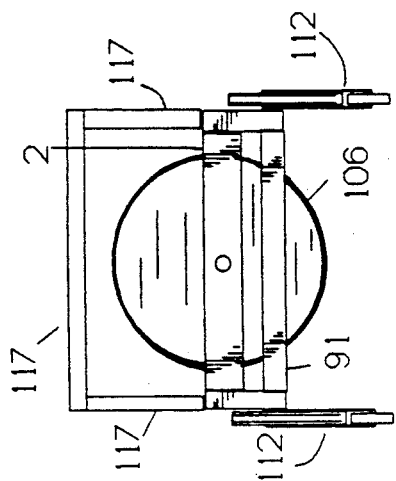
FIG. 15A shows the front view of the transporter with the assembled windtrap and winch unit loaded for shipment.
Figure 15B:
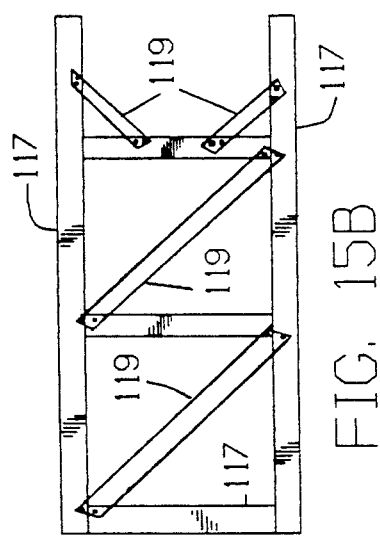
FIG. 15B shows the top view of only the winch unit as it loaded on the transporter to assure stability in shipment.
Figure 15C:
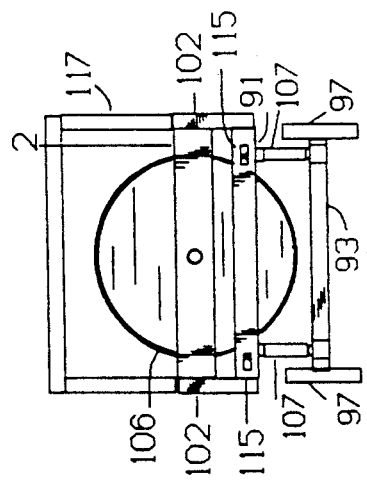
FIG. 15C shows the back view of the transporter with the assembled windtrap and winch unit loaded for shipment.
Figure 15:
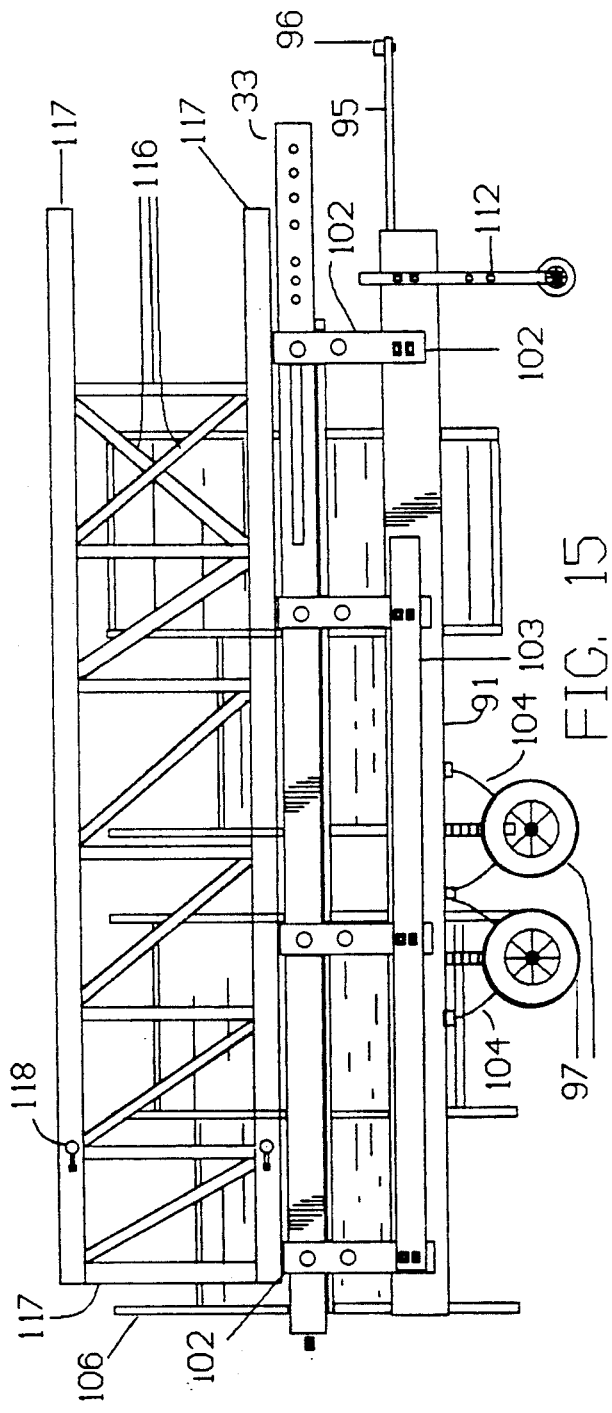
FIG. 15 shows the side view of the transporter with the assembled windtrap unit and the assembled winch unit loaded for shipment.

FIG. 15 shows the side view of the transporter with both the windtrap unit and the winch structure loaded onto the transporter. The structural frame 33 of the windtrap unit is attached to the transporter side mounts 102. The total assembled windtrap 106 can be transported in this manner. Holes are predrilled in the structural frame 33 of the windtrap unit and the transporter side mounts. The winch frame 117 rests on the transporter side mounts 102. The braces that hold the winch unit in position in transport are not shown. The winch assembly cross member 116 provides stability for the windtrap also provides stability in shipment. Pulley rollers 118 are also shown.

FIG. 15A shows the front view of the of the transporter with intent to highlight only the adjustable wheels 112. Also shown is the winch frame 117, the transporter frame 91, the windtrap unit frame 2, and the windtrap unit 106.

FIG. 15B shows only the top view of the wind assembly as it rests on the transporter to show stability in shipment.

FIG. 15C shows the back view of the transporter with the assembled windtrap unit 106 and the winch structure 117 attached to the transporter by the transporter side mounts 102. The wheels 97, sprints 107, and axle 92 are also shown. Running lights 115 are also provided.

We claim:

1. An energy producing system comprising of:
   at least one windmill including a support means, a winch structure, an electrical component used to convert DC current to usable AC current, a shaft rotor assembly mounted to support means, said rotor assembly including a plurality of vanes in sets of four windtraps mounted to said rotor assembly and rotatable by the impact of wind, said rotor assembly including a pulley capable of supporting a plurality of two sets of induction generators mounted on the support assembly, with the generator pulleys attached to said flywheel pulley of the rotor assembly by belts, the improvement comprising of a secondary pulley on the said rotor assembly capable of supporting a plurality of steam turbines, with the said steam turbine attached to said secondary pulley of the rotor a mounted on the support assembly and the windmill foundation, said steam turbines so attached as to be able to be removed permitting windmill structure to be taken from a horizontal to vertical position utilizing the attached winch structure;
   at least one solar apparatus consisting of a plurality of exoskeletal frames having parallel spaced ribs, means defining a foundation shaft to which a plurality of frames are attached by moveable braces, means for attaching a miniature exoskeletel frame on the outermost position of said shaft on which a solar eye unit may be attached, means defining an axial opening, a foundation shaft disposed in said axial opening, means for rotatably supporting said shaft, and coupling collar within said axial opening, controlled by an on board controller connected electrically to a system controller, having capability of receiving commands to either activate or deactivate from said system controller, said on board controller supplied electricity through conduit lines leading to controller housing where resides a battery bank and inverters to support such activity, said on board controller capable of receiving readings of light intensity from solar eye for positioning plurality of said frames so as to keep surface directly perpendicular to the light rays;
   at least two sets of two panels consisting of an open framework lattice having parallel spaced ribs on which is attached tubular cooper or aluminum or other heat absorbent metal arranged in an array of at least two parallel piping lines and means of attaching said piping to said frame, coupling at the end of pipe provides means for interconnect to another pipe of another panel, vertically spaced tiers extending from base frame over the piping providing a harness support for a plurality of lenses so spaced from the piping as to focus light directly onto the piping, said harness and lenses occuring in a series of not more than ten per said pipe line, each panel piping to also have one check valve at the start of the piping from where flow commences, each of said panels has fastener means of attaching to said solar apparatus;
   at least one water pump capable of pumping water at a water pressure adequate to support a single solar apparatus supplied by electrical power and activated or deactivated by circuitry controlled by a system controller, said pump connected to tubular aluminum or other usable metal which is in turn connected to the piping of the solar apparatus;
   at least two tubular aluminum lines, or other usable tubular metal lines, extending from a plurality of solar apparatus frames, each having at least two said panels, to each of the steam turbines of the windmill;
   a system battery bank stored at the system controller housing and means of converting DC current to usable AC current;
   control system including means of measuring and analyzing wind velocity, said control system including means of measuring and analyzing light intensity, said control system including means of measuring and analyzing line load, wherein said control system can send electronic signals recognizable by a solar apparatus controller to either activate or deactivate the said solar apparatus and said control system can send electronic signals recognizable by a water pump circuitry to either activate or deactivate the said water pump.

2. An energy producing system of claim 1, wherein each water piping supporting a windmill site has check valves to accept steam from a natural gas boiler, said natural gas boiler controlled by said system controller and said water pump controlled by said system controller.

3. An energy producing system comprising of:
   at least one windmill including a support means, a winch structure, electrical components to convert DC current to usable AC current, a shaft rotor assembly mounted to support means, said rotor assembly including a plurality of vanes in sets of four windtraps mounted to said rotor assembly and rotatable by the impact of wind, the improvement comprising of said rotor assembly inserted into the neck housing of a pulley from the top capable of supporting a plurarity of two sets of induction generators mounted on the support assembly, with the generator pulleys attached to said pulley of the rotor assembly by belts, the said shaft assembly is not interconnected within neck housing of pulley, means are provided to interconnect said shaft rotor as well as disconnect said shaft rotor from the pulley of the induction generators, a second shaft rotor assembly mounted to support means, set rotor assembly includes a plurality of steam turbines, with the said steam turbine attached to said secondary flywheel pulley of the rotor a mounted on the support assembly and the windmill foundation, said steam turbines so attached as to be able to be removed permitting windmill structure to be taken from a horizontal to vertical position utilizing the attached winch structure, said shaft rotor inserted into the neck housing of the pulley from the bottom, the said shaft assembly is not interconnected within neck housing of the pulley of the induction generators, means are provided to interconnect said shaft rotor as well as disconnect said shaft rotor from the flywheel pulley of the induction generators;

a plurality of windmill rotor shafts having means to interconnect to the rotor pulley by using a rod insert to grove means of interface, said interconnect is controlled by an elctromagnetic insert within the shaft being further controlled by electronic circuitry capable of activating in one direction the electro-magnetic field or the other, such said means of interconnect and disconnect are controlled by a secondary circuit that can receive radio signals by means of a receiver mounted on top of the wind driven rotor shaft, said electronic circuitry and electro-magnetic induction obtain their electricity from a battery stored within the rotor shaft, said battery being charged by a photovoltaic battery charger mounted on top of the rotor shaft, radio signals send to the receiver originate with the system controller which has means of transmitting;

at least one solar apparatus consisting of a plurality of exoskeletal frames having parallel spaced ribs, means defining a foundation shaft to which a plurality of frames are attached by moveable braces, means for attaching a miniature exoskeletel frame on the outermost position of said shaft on which a solar eye unit may be attached, means defining an axial opening, a foundation shaft disposed in said axial opening, means for rotatably supporting said shaft, and coupling collar within said axial opening, controlled by an on board controller connected electrically to a system controller, having capability of receiving commands to either activate or deactivate from said system controller, said on board controller supplied electricity through conduit lines leading to controller housing were resides a battery bank and inverters to support such activity, said on board controller capable of receiving readings of light intensity from solar eye for positioning plurality of said frames so as to keep surface directly perpendicular to the light rays;

at least two sets of two panels consisting of an open framework lattice having parallel spaced ribs on which is attached tubular cooper or aluminum or other heat absorbent metal arranged in an array of at least two parallel piping lines and means of attaching said piping to said frame, coupling at the end of pipe provides means for interconnect to another pipe of another panel, vertically spaced tiers extending from base frame over the piping providing a harness support for a plurality of lenses so spaced from the piping as to focus light directly onto the piping, said harness and lenses occuring in a series of not more than ten per said pipe line, each panel piping to also have one check valve at the start of the piping from where flow commences, each of said panels has fastener means of attaching to said solar apparatus;

at least one water pump capable of pumping water at a water pressure adequate to support a single solar apparatus supplied by electrical power and activated or deactivated by circuitry controlled by a system controller, said pump connected to tubular aluminum or other usable metal is in turn connected to the piping of the solar apparatus;

at least two tubular aluminum, or other usable tubular metal lines, extending from a plurality of solar apparatus frames, each having at least two said panels, to each of the steam turbines of the windmill;

a system battery bank stored at the system controller housing and means of converting DC current to usable AC current;

a control system for controlling the system operation, said control system including means of measuring and analyzing wind velocity, said control system including means of measuring and analyzing light intensity, said control system including means of measuring and analyzing line load, wherein said control system can send electronic signals recognizable by a solar apparatus controller to either activate or deactivate said solar apparatus and said control system can send electronic signals recognizable by a water pump circuitry to either activate or deactivate said water pump.

4. An energy producing system of claim 3, wherein each water piping supporting a windmill site has check valves to accept steam from a natural gas boiler, said natural gas boiler controlled by said system controller and said water pump controlled by said system controller.

* * * * *